United Stat

Brisard

[15] 3,690,145
[45] Sept. 12, 1972

[54] VEHICLE SUSPENSION TESTING APPARATUS
[72] Inventor: Gerard Brisard, Fontenay-sous-Bois, France
[73] Assignee: Establissement Muller & Cie, Paris, France
[22] Filed: Oct. 7, 1970
[21] Appl. No.: 78,670

[30] Foreign Application Priority Data
Oct. 15, 1969  France......................6935345

[52] U.S. Cl.........................................73/11, 73/71.7
[51] Int. Cl..............................................G01m 17/04
[58] Field of Search.................................73/11, 71.7

[56] References Cited
UNITED STATES PATENTS
2,934,940  5/1960  Beissbarth......................73/11

FOREIGN PATENTS OR APPLICATIONS
1,232,372  3/1963  Germany......................73/11

Primary Examiner—James J. Gill
Attorney—Ernest G. Montague

[57] ABSTRACT

This apparatus for testing the suspension system of vehicles comprises a platform to which vertical vibrations are imparted possibly through a crank-and-rod mechanism driven from a motor having a flywheel and a clutch mounted on its output shaft, said platform supporting the wheel to be tested through a shaped plate pivoted at one end to said platform and bearing at the opposite end on one or a plurality of pressure detecting elements such as piezo-electric elements responsive to the stress variations caused by the wheel oscillations and to transmit same to a dial instrument and/or a recorder.

7 Claims, 5 Drawing Figures

3,690,145

PATENTED SEP 12 1972

Inventor
Gerard Brisard
By Ernest F. Marmorek
Attorney

VEHICLE SUSPENSION TESTING APPARATUS

The present invention relates to testing and control apparatus and stands for ascertaining the proper operation of suspension systems of land vehicles, and notably the proper operation of the shock-absorbers associated with the wheels of these vehicles, without having to disassemble the members to be checked.

Some apparatus now in use to this end are designed with a view to set in motion the sprung mass of a vehicle. However, apparatus of this kind are objectionable in that they are relatively sophisticated and nevertheless they are not capable of making sufficiently accurate measurements.

Other known apparatus are adapted to impress vertical oscillations to the wheel of a vehicle by means of a vibrating plate shaped for receiving this wheel, detecting means being provided on the other hand for registering or controlling the inherent oscillations of the wheel. But also in this case existing apparatus of this character are not capable of making sufficiently accurate measurements. This inconvenience is due chiefly to the particular mounting and also to the nature of the detecting means used for controlling the wheel oscillations.

In fact, these means consist of a control system adapted to measure the amplitude of the oscillations of the corresponding axle in relation to the vehicle body or to a fixed reference point taken for instance on the floor. Now the measurements made through this procedure cannot give or lead to reliable conclusions as to the operation or condition of the shock absorber associated with the wheel thus checked or tested.

It is therefore a primary object of the present invention to provide an apparatus adapted to make and record measurements permitting this checking.

Although the apparatus according to the present invention also comprises a vibrating platform adapted to impress vertical vibration to the wheel to be tested, its arrangement differs considerably from hitherto known apparatus of the first type mentioned hereinabove. In fact, this apparatus is characterized essentially in that the vibrating platform carries a plate or like member shaped or adapted to act as a support to, or hold, the wheel of the vehicle which is to be tested, this plate or like member having one end attached or pivoted to said platform and the opposite end adapted to bear on this platform through the medium of pressure detecting means constituting the means for controlling the wheel oscillations.

With the arrangement broadly set forth hereinabove, accurate measurements can be recorded by means of said detecting element or elements, from which valuable data and conclusions can be drawn as to the mode of operation and condition of the corresponding shock absorbers.

According to another feature characterizing the apparatus of this invention the pressure detecting element or elements interposed between the free end of the wheel-supporting plate the vibrating platform, consist or one or a plurality of piezo-electric elements, such as piezo-electric ceramics connected to an electric circuit comprising a dial-type measurement instrument, associated, if desired, with a recording apparatus. The use of these elements imparts a high degree of sensitivity to the apparatus of this invention, which is capable of measuring with precision the value of the damping force applied to the unsprung parts of a vehicle, under conditions very close to those encountered in actual service on the road.

However, other advantageous features of this invention will appear as the following detailed description thereof proceeds with reference to the accompanying drawings showing diagrammatically by way of example typical forms of embodiment of the invention ; in the drawings.

Figure 1:
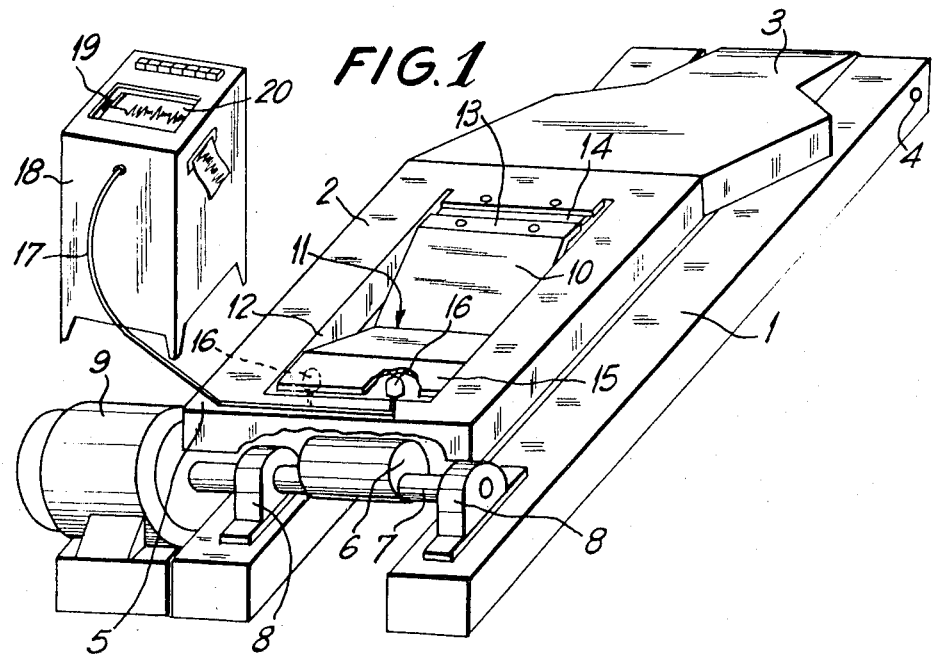
FIG. 1 is a perspective view showing a first form of embodiment of the wheel suspension testing apparatus of this invention.
Figure 2:
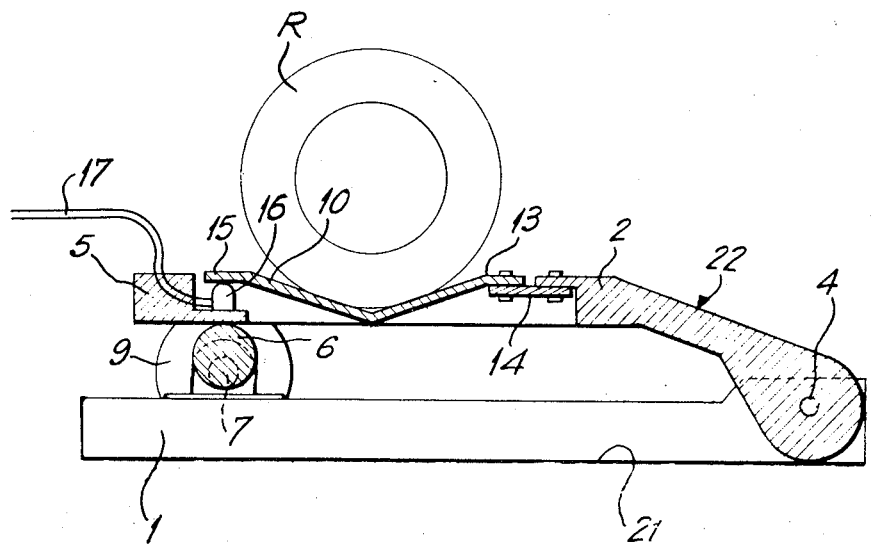
FIG. 2 is a longitudinal section of the apparatus of FIG. 1, shown in the position obtaining during an actual test.

The apparatus illustrated in FIGS. 1 and 2 comprises a frame structure or base 1 on which a vibrating platform 2 is mounted. One end 3 of this platform is pivotally mounted by means of a horizontal shaft 4 carried by the frame 1.

The opposite end 5 of platform 2 bears on a movable member adapted to impart vertical oscillations thereto. In the example illustrated this member comprises an eccentric, in the form of a cylinder 6 secured in an eccentric position to a horizontal shaft 7 trunnioned in end bearings 8 carried by the frame 1.

This shaft 7 is rotatably driven from a suitable source of power, for example an electric motor 9.

The vibrating platform 2 carries a plate or like member 10 adapted to support the wheel to be checked or tested. To this end, this plate 10 may be formed with an intermediate depression 11. The plate 10 extends within an opening 12 formed in the vibrating platform and has one end 13 secured to this platform. In this example (FIGS. 1 and 2) the plate 10 is secured at its opposite end to the platform 2 by means of a flexible connecting strap or band 14, for example of metal, having its edges secured to said vibrating platform and to the corresponding end of plate 10 by means of rivets or any other suitable fastening members.

The opposite end 15 of this plate is free in relation to the vibrating platform, However, this opposite end 15 bears on one or a plurality of pressure detecting elements interposed between said plate end and the registering portion of the end 5 of the vibrating platform. Thus, in the example illustrated two pressure detecting elements 16 are disposed on a common transverse line, under the end 15 of plate 10.

However, as already mentioned hereinabove, it would also be possible to use only one detecting element of this kind.

It may also be noted that in the example illustrated the eccentric roller 6 adapted to impart vertical and alternated oscillations to the vibrating platform 2 is disposed in the same vertical plane as the two detecting elements 16. However, this arrangement is not compulsory, since the eccentric roller may be positioned differently.

According to another essential feature characterizing the apparatus of this invention, the pressure detecting element or elements 16 consist of one or a plurality of piezo-electric elements, such as piezo-electric ceramics. These elements are connected through a cable 17 to an electrical measuring instrument. This instrument may be housed or mounted preferably in a cabinet or control board or panel independent of the other component elements of this apparatus, and at any desired distance therefrom.

This device comprises an electrical amplifying circuit incorporating an electrical measuring instrument such as a galvanometer of the crossed-field, low-inertia type, a potentiometer being advantageously provided to permit the adjustment of its sensitivity. However, the index pointer of the measuring instrument may advantageously be replaced by a stylus 19 adapted to inscribe on a recording chart or tape 20 the oscillations produced during the test.

The above-described test stand operates as follows: after having properly positioned the wheel R to be tested on the carrier plate 10, alternate and substantially vertical oscillations are imparted to the vibrating platform 2 by rotating the eccentric roller 6 in order to produce similar oscillations of the plate 10 and tested wheel R.

During these movements, the pressure detecting elements 16 give a measurement of the variations in the bearing force of this plate and therefore of the wheel supported thereby on the vibrating platform. Under these conditions, these elements will detect the variations in the stress, due to the inertia of the moving parts. Now these variations increase as the efficiency of the damping or shock-absorbing means associated with the wheel decrease. Therefore, the tester can readily ascertain whether the shock absorber associated with the wheel operates properly or not.

Of course, the amplitude of the stress variations detected by the detectors 16 can be observed from the oscillations of the index pointer of the measuring instrument, or from the graphical record inscribed by the stylus 19.

In this last instance, the quality of the shock absorber associated with the tested wheel can be readily ascertained by simply reading the curve inscribed by the stylus on the recording chart. However, it is clear that a photographic recording, an/or the projection of the resulting data onto a screen, may also be contemplated.

The apparatus according to this invention may be used for checking the proper operation of the suspension systems of land vehicles and notably of the shock absorbers associated with the wheels of these vehicles. To this end, the apparatus may be installed either in a pit dug in the floor or directly on the floor of the test room, as in the case illustrated in FIGS. 1 and 2, wherein the vibrating platform 2 comprises at its pivoted end an inclined plane 22 facilitating the rolling of the wheel to be checked to its testing position on the carrier plate 10.

As already mentioned in the preamble of this description, the testing apparatus according to this invention is capable of making very accurate measurements with a high degree of sensitivity.

On the other hand, it may be pointed out that due to the particular arrangement contemplated the measurements thus made are such that valuable information can be derived therefrom in connection with the mode of operation or actual condition of the tested shock absorbers. Moreover, it will be noted that the detecting elements 16 are safely protected against undesired shocks and jolts, due to their position between the wheel-supporting plate 10 and the vibrating platform 2.

Of course, the apparatus of this invention should not be construed as being limited by the single, above-described form of embodiment. Thus, instead of connecting the wheel carrier plate 10 through a flexible strip or band 14 to the vibrating platform 2, the corresponding end 13 of plate 10 may be rigidly secured to the registering portion of said platform 2. But in this case the wheel carrier plate must have a certain inherent flexibility in its longitudinal direction, so that the detecting elements 16 may record the stress variations produced during the operation of the apparatus.

Figure 3:
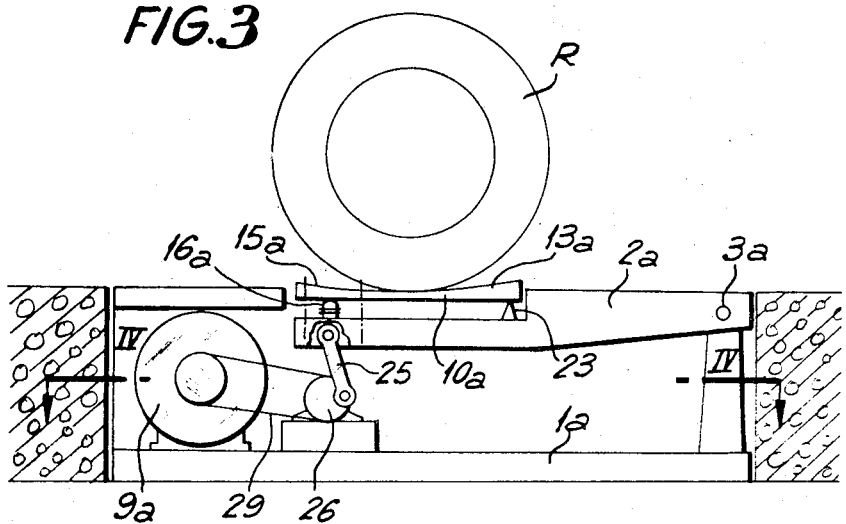
FIG. 3 is a similar section but illustrating a modified form of embodiment of the apparatus.
Figure 4:
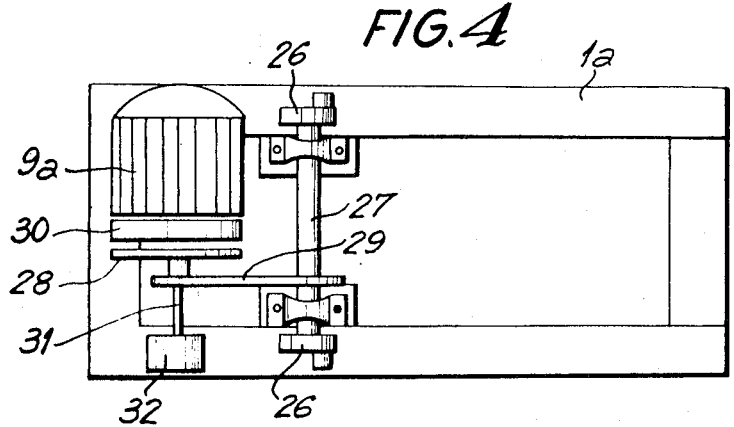
FIG. 4 is a horizontal section taken along the line IV—IV of FIG. 3.
Figure 5:
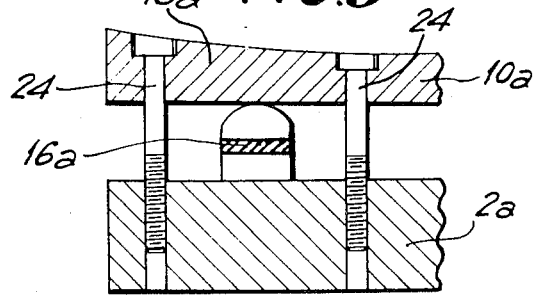
FIG. 5 is a vertical section showing a detail of this testing apparatus.

FIGS. 3 to 5 illustrate another form of embodiment of this apparatus. In this modified form of embodiment the general structure of the apparatus is substantially unchanged, and the similar or identical component elements thereof already provided in the preceding form of embodiment are designated in FIGS. 3 to 5 with the same reference numerals bearing the index $a$.

Thus, this apparatus comprises a vibrating platform $2a$ pivotally mounted by means of a horizontal shaft $3a$ on a frame structure $1a$. As in the preceding case, this platform carries a plate $10a$ adapted to carry the wheel R to be checked. However, instead of being connected to the platform $2a$ this plate is pivotally mounted at its corresponding end $13a$. In the example illustrated this pivotal mounting is obtained by supporting the end $13a$ of the wheel carrier plate on knife edges 23 rigid with the vibrating platform $2a$.

The opposite end $15a$ of this plate $10a$ bears as in the preceding example on one or a plurality of pressure detectors $16a$ consisting for instance of piezo-electric elements.

However, as illustrated in FIG. 5, these elements may advantageously be prestressed. To this end, a pair of bolts 24 are disposed on either side of each element for connecting the end $15a$ of plate $10a$ to the corresponding portion of the vibrating platform $2a$. These bolts are then tightened in order to apply a prestress to the piezo-electric elements $16a$, thus improving appreciably the detection effected by these elements when they are allowed to expand. On the other hand, this arrangement further improves the reliability of the piezo-electric substance constituting these elements.

In this modified form of embodiment the member imparting oscillatory movements to the vibrating platform $2a$ consists of a pair of connecting-rods 25 disposed on either side of the apparatus and incorporated in a crank and rod mechanism 26 carried by a rotatably driven shaft 27.

It may also be noted that, as in the preceding form of embodiment, the members acting upon the vibrating platform are disposed just beneath the line along which the detecting elements $16a$ are arranged. But also in this case it will readily occur to anybody skilled in the art that various modifications may be brought to this arrangement without departing from the basic principles of the invention.

According to another feature characterizing this second form of embodiment of the invention the rotary shaft 27 is driven from an asynchronous electric motor 9a through a clutch 28 having its input shaft rigid with the output shaft 9a of said motor and its output shaft rigid with the input member of a transmission operatively connecting said clutch to said shaft 27, this transmission consisting if desired of a simple endless chain 29.

Preferably, the output shaft of motor 9a comprises a smoothing or regulating flywheel 30. On the other hand, the clutch 28 is responsive to actuating means 31–32 adapted to be remote-controlled. Preferably, these means may be controlled from the control cabinet board, or panel 18 illustrated in FIG. 1.

With this arrangement, the wheel to be tested may be caused to oscillate by simply using an asynchronous motor of relatively low power rating.

In this respect, it may be noted that oscillating a vehicle wheel producing a ground reaction of say, 1,000 lbs. or more, even at a relatively low amplitude, demands at the start a high torque difficult to obtain if the source of power is an asynchronous motor of relatively low power rating.

However, due to the particular arrangement contemplated in this form of embodiment (FIGS. 3 to 5) it is possible to start beforehand the motor 9a at its rated power but under no-load conditions while keeping the clutch 29 disengaged.

When it is desired to make a measurement, the clutch 28 is actuated in order to drive the shaft 27. The kinetic energy or momentum stored by the flywheel 30 and the motor rotor is then applied suddenly to the shaft 27, so that the wheel is oscillated at the desired rate, and subsequently the only function of the electric motor consists in sustaining the rotational movement thus started.

Therefor, the apparatus illustrated in FIGS. 3 to 5 is attended by a number of improvements in addition to those described with reference to FIGS. 1 and 2. But also in this case it will clearly occur to those conversant with the art that other modifications and variations could be contemplated without departing from the spirit and scope of the invention. Thus, for instance, the piezo-electric elements 16 or 16a could be replaced by other pressure detecting means of suitable type for measuring the variations in the stress applied thereto.

What I claim is:

1. Vehicle suspension testing apparatus comprising a base, a vibrating platform mounted on said base, means for imparting vertical vibrations to said platform, a support adapted to receive one wheel of the vehicle during the test, and which has one end mounted on said vibrating platform, and provided with means permitting relative displacement between said platform and said support, pressure detecting means interposed between said vibrating platform and the other end of said support, and said detecting means constituting means responsive to the wheel oscillations.

2. Vehicle suspension testing apparatus according to claim 1, in which the pressure detecting means interposed between the free end of the wheel carrier plate and the vibrating platform consist of at least one piezo-electric element connected to an electric circuit comprising an electrical measuring instrument.

3. Apparatus according to claim 1, in which the corresponding end of the wheel support is attached to said vibrating platform through the medium of a flexible connecting strip.

4. Apparatus according to claim 1, in which the corresponding end of the wheel support is pivotally mounted on to said vibrating platform.

5. Apparatus according to claim 1, in which the corresponding end of the wheel support is rigidly secured on said vibrating platform, said wheel support having a certain inherent flexibility in its longitudinal direction.

6. Apparatus according to claim 1, in which said means for imparting vertical vibrations to said platform constitutes mechanical means so arranged and located as to engage the portion of said platform which is disposed substantially in the same vertical plane as the transverse line along which the pressure detecting means are disposed.

7. Apparatus according to claim 1, including mechanical means engaging said vibrating platform, a motor, a clutch from said motor having an output shaft provided with a flywheel and driving said mechanical means.

* * * * *

UNITED STATES PATENT OFFICE
CERTIFICATE OF CORRECTION

Patent No. 3,690,145             Dated September 12, 1972

Inventor(s) Gerard Brisard

It is certified that error appears in the above-identified patent and that said Letters Patent are hereby corrected as shown below:

On the cover sheet [73] "Establissement Muller & Cie, Paris, France", should read -- of 1/2 to Etablissements Muller & Cie, Paris, France, a corporation -- .

Signed and sealed this 1st day of May 1973.

(SEAL)
Attest:

EDWARD M. FLETCHER, JR.          ROBERT GOTTSCHALK
Attesting Officer                 Commissioner of Patents